US012762166B2

(12) United States Patent
Ghalyan et al.

(10) Patent No.: US 12,762,166 B2
(45) Date of Patent: Oct. 13, 2026

(54) SYSTEMS AND METHODS FOR LARGE LANGUAGE MODEL-BASED CHARACTERIZATION AND DETECTION OF MATCHES/MISMATCHES IN CONFIGURATION FILES OF CONNECTED DEVICES

(71) Applicant: JPMORGAN CHASE BANK, N.A., New York, NY (US)

(72) Inventors: Najah Ghalyan, Wayne, NJ (US); Gaston Liberman, Buenos Aires (AR); William Joel Guest, Conroe, TX (US); Sean Moran, London (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 134 days.

(21) Appl. No.: 18/964,130

(22) Filed: Nov. 29, 2024

(65) Prior Publication Data

US 2026/0154305 A1 Jun. 4, 2026

(51) Int. Cl.
*G06F 16/334* (2025.01)
*G06F 16/31* (2019.01)
*G06F 16/383* (2019.01)

(52) U.S. Cl.
CPC ........ *G06F 16/3344* (2019.01); *G06F 16/322* (2019.01); *G06F 16/383* (2019.01)

(58) Field of Classification Search
USPC ........................................ 704/1–504
See application file for complete search history.

(56) References Cited

U.S. PATENT DOCUMENTS

| | | | | |
|---|---|---|---|---|
| 7,712,024 B2 * | 5/2010 | Reynar | G06Q 30/02 | 707/739 |
| 8,086,592 B2 * | 12/2011 | Mion | G06F 16/00 | 707/711 |
| 8,549,494 B2 * | 10/2013 | Neogi | G06F 8/427 | 717/143 |
| 8,639,493 B2 * | 1/2014 | Haug | G06F 40/216 | 704/10 |

(Continued)

*Primary Examiner* — Marcus T Riley
(74) *Attorney, Agent, or Firm* — GREENBERG TRAURIG LLP

(57) ABSTRACT

Systems and methods for LLM-based characterization and detection of matches/mismatches in configuration files are disclosed. A method may include: retrieving a plurality of configuration files, each configuration file associated with a connected electronic device; parsing each of the plurality of configuration files into a plurality of sections and subsections; storing the parsed configuration files to a database; receiving, from a user interface for the computer program, a configuration-related query; extracting metadata and keywords from the configuration-related query; identifying one of the stored parsed configuration files using the metadata; retrieving the identified stored parsed configuration file; identifying relevant branches in the retrieved configuration file that include the keywords; generating a prompt for a large language model including the configuration-related query and the identified branches as context for the configuration-related query; receiving a response to the prompt from the large language model; and returning the response to the user interface.

20 Claims, 5 Drawing Sheets

(56) References Cited

U.S. PATENT DOCUMENTS

| | | | | |
|---|---|---|---|---|
| 11,528,190 | B2 * | 12/2022 | Mallipudi | G06F 8/65 |
| 11,947,440 | B2 * | 4/2024 | Dellatorre Borges | G06F 11/3612 |
| 12,339,875 | B1 * | 6/2025 | Veillon | G06F 16/243 |
| 12,481,666 | B1 * | 11/2025 | Jain | G06F 16/24578 |
| 2003/0028521 | A1 * | 2/2003 | Teloh | H04L 41/082 |
| 2009/0007083 | A1 * | 1/2009 | Neogi | G06N 3/126<br>717/143 |
| 2010/0161316 | A1 * | 6/2010 | Haug | G06F 40/216<br>704/9 |
| 2013/0290320 | A1 * | 10/2013 | Zhu | G06F 16/95<br>707/723 |
| 2026/0087036 | A1 * | 3/2026 | Patthar | G06F 16/3329 |
| 2026/0119538 | A1 * | 4/2026 | Rastogi | G06F 16/3329 |
| 2026/0154305 | A1 * | 6/2026 | Ghalyan | G06F 16/3344 |

* cited by examiner

SYSTEMS AND METHODS FOR LARGE LANGUAGE MODEL-BASED CHARACTERIZATION AND DETECTION OF MATCHES/MISMATCHES IN CONFIGURATION FILES OF CONNECTED DEVICES

BACKGROUND OF THE INVENTION

1. Field of the Invention

Embodiments relate to systems and methods for large language model-based characterization and detection of matches/mismatches in configuration files of connected devices.

2. Description of the Related Art

Organizations use a large number of connected electronic devices to route network traffic, such as routers, switches, etc. Mismatches in the configurations of these connected devices can lead to issues including communication failure, data corruption, errors and retransmissions, partial data transfer, synchronization issues, and protocol conflicts. Therefore, ensuring that device configurations match is crucial for reliable and accurate communication.

SUMMARY OF THE INVENTION

Systems and methods for large language model-based characterization and detection of matches/mismatches in configuration files of connected devices are disclosed. In one embodiment, a method may include: retrieving, by a computer program executed by an electronic device, a plurality of configuration files, each configuration file associated with a connected electronic device in a computer network; parsing, by the computer program, each of the plurality of configuration files into a plurality of sections and subsections; storing, by the computer program, the parsed configuration files to a database; receiving, from a user interface for the computer program, a configuration-related query; extracting, by the computer program, metadata and keywords from the configuration-related query; identifying, by the computer program, one of the stored parsed configuration files using the metadata; retrieving, by the computer program, the identified stored parsed configuration file; identify, by the computer program, relevant branches in the retrieved configuration file that include the keywords; generating, by the computer program, a prompt for a large language model including the configuration-related query and the identified branches as context for the configuration-related query; receiving, by the computer program, a response to the prompt from the large language model; and returning, by the computer program, the response to the user interface.

In one embodiment, the configuration files may be parsed into tree-like structures.

In one embodiment, each section and subsection may include a line number of the configuration file, an identification of one or more parent sections and/or subsections, and an identification of one or more child subsections.

In one embodiment, the keywords comprise device metadata keywords, platform metadata keywords, configuration metadata keywords, and configuration file section keywords.

In one embodiment, the identified relevant sections and subsections of the retrieved configuration file comprise all of the extracted keywords.

In one embodiment, the method may also include removing, by the computer program, duplicate branches.

According to another embodiment, a method may include: retrieving, by a computer program executed by an electronic device, a plurality of configuration files, each configuration file associated with a connected electronic device in a computer network; parsing, by the computer program, each of the plurality of configuration files into a plurality of sections and subsections; storing, by the computer program, the parsed configuration files to a database; retrieving, by the computer program, a plurality of the stored parsed configuration file from the database; generating, by the computer program, embeddings for the sections and subsections of the retrieved stored parsed configuration files; comparing, by the computer program, the embeddings of the sections and subsections of the stored parsed configuration files; and grouping, by the computer program, the connected electronic devices based on a similarity of the embeddings of their sections and subsections.

In one embodiment, the configuration files may be parsed into tree-like structures.

In one embodiment, the embeddings of the sections and subsections of the stored parsed configuration files may be compared using cosine similarity values for the embeddings of the sections and subsections of the stored parsed configuration files.

In one embodiment, the connected electronic devices may be grouped according to one or more similarity thresholds.

In one embodiment, the method may also include generating, by the computer program, a report comprising a visual representation of the configuration files for the connected electronic devices. The report may include hyperlinks to the configuration files for the connected electronic devices.

According to another embodiment, a method may include: retrieving, by a computer program executed by an electronic device, a plurality of configuration files, each configuration file associated with a connected electronic device in a computer network; parsing, by the computer program, each of the plurality of configuration files into a plurality of sections and subsections; storing, by the computer program, the parsed configuration files to a database; retrieving, by the computer program, a first stored parsed configuration file for a first configuration file and a second stored parsed configuration file for a second configuration file from the database; generating, by the computer program, embeddings for the sections and subsections of the first stored parsed configuration file and the second stored parsed configuration file; matching, by the computer program, embeddings for the sections and subsections of the first stored parsed configuration file to embeddings for the sections and subsections of the second stored parsed configuration file; and rebuilding, by the computer program, one of the sections or subsections of the first configuration file or the second configuration file in response to the section or subsection not matching.

In one embodiment, the plurality of configuration files may be parsed into tree-like structures.

In one embodiment, the sections and subsections may be organized based on a depth for each section and subsection in a hierarchy of each of the plurality of the configuration files.

In one embodiment, the computer program matches the embeddings of the sections and subsections of the first stored parsed configuration file to embeddings for the sections and subsections of the second stored parsed configuration file by matching lines in the first stored parsed configuration file to lines in the second stored parsed configuration file.

In one embodiment, the computer program uses a line parameter to set a window for searching the second stored parsed configuration file for a configuration line in the first stored parsed configuration file.

In one embodiment, the searching may be performed in a first direction, and then in a second direction.

In one embodiment, the method may also include generating, by the computer program, an audit report comprising a visual representation of the first configuration file and the second configuration file, and similarity scores for configuration lines in the first configuration file and the second configuration file. The audit report may include hyperlinks to the first configuration file and the second configuration file.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments relate to systems and methods for large language model-based characterization and detection of matches/mismatches in configuration files of connected devices.

Embodiments may detect configuration mismatches in connected electronic devices and may identify fields within the configuration files that are matching/mismatching. Using a large language model (LLM), embodiments may provide a chatbot specifically designed to answer configuration-related questions, may cluster connected electronic devices based on their configuration files into groups of connected electronic devices having the same configuration files, connected electronic devices having similar configuration files, and connected electronic devices having different configuration files.

For example, given a pair of configuration files from two connected electronic devices, embodiments may generate a report that identifies all the parts of the configuration files that are matching, and parts that are mismatching.

Figure 1:
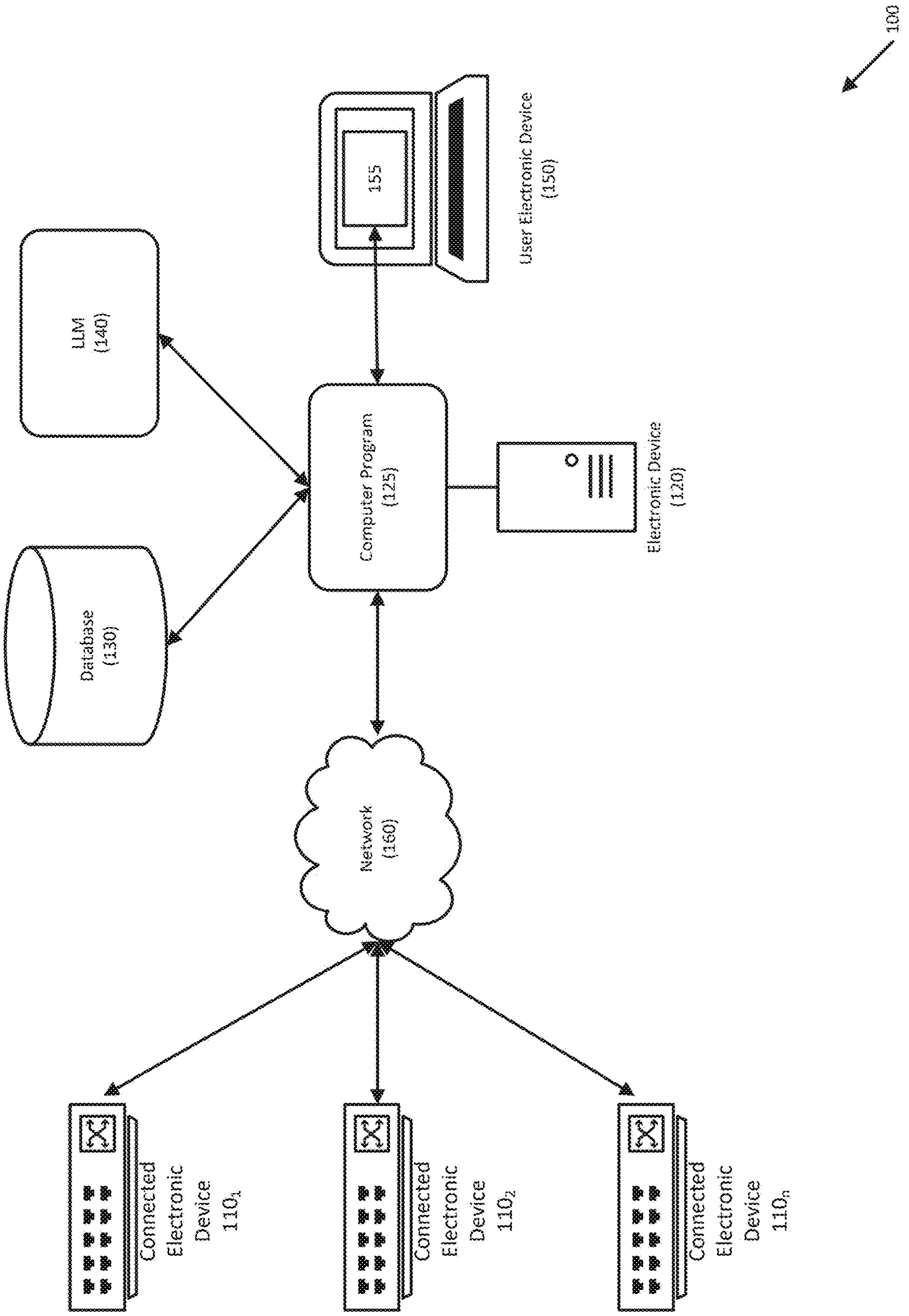
FIG. 1 illustrates a system for large language model-based characterization and detection of matches/mismatches in configuration files of connected devices according to an embodiment.

Referring to FIG. 1, a system for large language model-based characterization and detection of matches/mismatches in configuration files of connected devices is disclosed according to an embodiment. System 100 may include a plurality of connected electronic devices 110 (e.g., $\mathbf{110}_1$, $\mathbf{110}_2$, . . . $\mathbf{110}_n$). Examples of connected devices 110 may include networking devices that may have its configuration managed using a configuration file, including routers, switches, etc.

Connected devices 110 may interface with other electronic devices (e.g., servers, computers, printers, etc.)(not shown) as well as with each other, over network 160. Network 160 may be a local area network (LAN), a wide area network (WAN), the Internet, or any other suitable network.

Computer program 125 may be executed by electronic device 120, such as servers (e.g., physical and/or cloud based), computers (e.g., workstations, desktops, laptops, notebooks, tablets, etc.). Computer program 125 may manage configuration files for one or more of connected electronic devices 110.

Computer program 125 may retrieve configuration files for connected electronic devices 110 using specific commands. In one embodiment, the configuration files may be saved in database 130.

Computer program 125 may access database 130, which may store an inventory of connected electronic devices 110 within network 160, as well as configuration files for one or more of connected electronic devices 110. For example, database 130 may store past configuration files (e.g., historic configuration files representing prior configurations), and pre- and post-command outputs for configuration changes, etc.

Computer program 125 may access large language model (LLM) 140, which may be any suitable LLM. Computer program 125 may submit prompts to LLM 140 with context, and may receive a response.

In one embodiment, LLM 140 may be trained with information for the types of connected electronic devices in the network, including information from the manufacturers of the connected electronic devices. For example, in addition to typical training materials (e.g., websites, books, articles, and other publicly available written material), the LLM may be trained with detailed information regarding command usage, troubleshooting, and best practices for network security and performance for the specific connected electronic devices.

System 100 may further include user electronic device 150, which may be a computer, a smart device (e.g., a smart watch, a smart phone, etc.), and Internet of Things (IoT) appliance, etc. User electronic device 150 may execute user computer program 155, which may be an application, a browser, etc.

Figure 2:
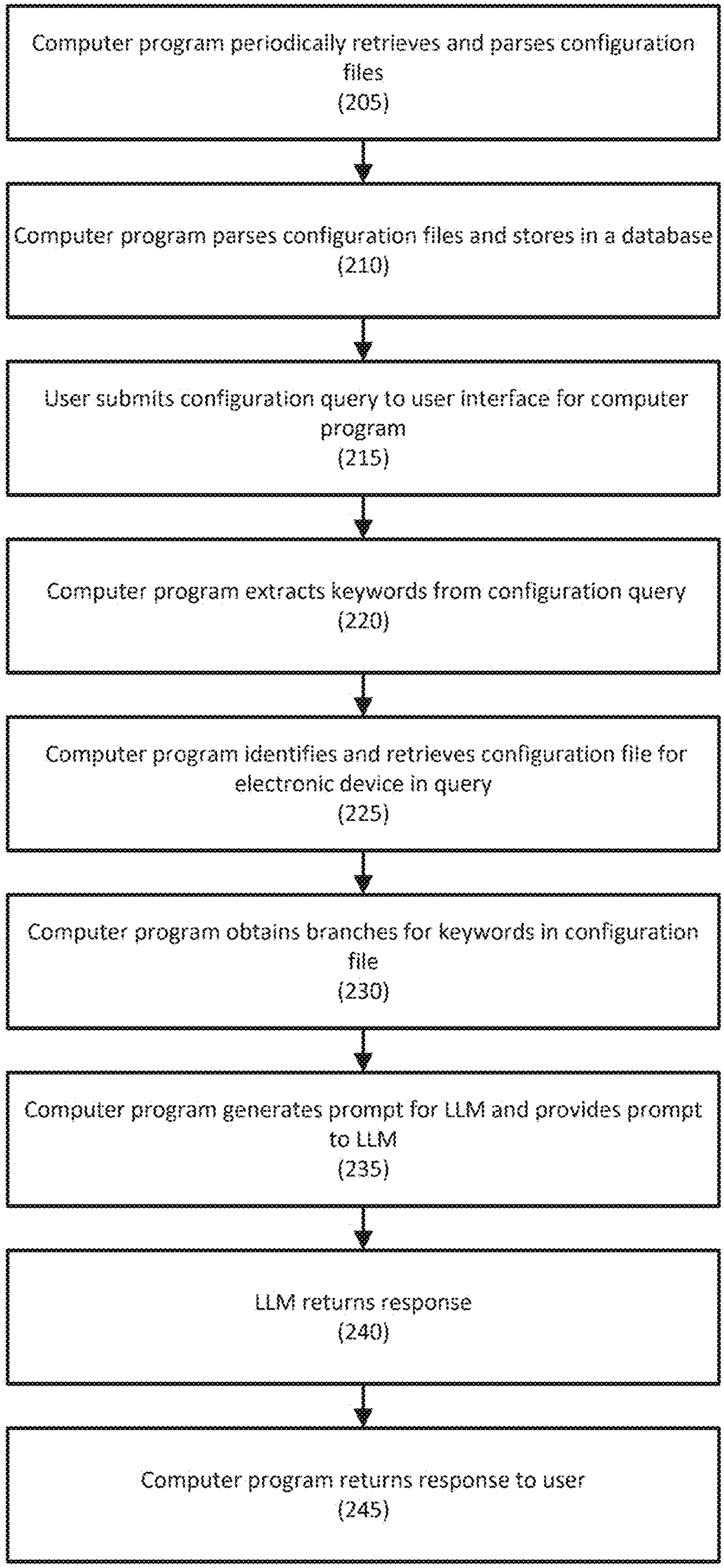
FIG. 2 depicts a method for providing automated responses to configuration queries according to an embodiment.

Referring to FIG. 2, a method for providing automated responses to configuration queries is disclosed according to an embodiment.

In step 205, periodically or as otherwise necessary and/or desired, a computer program executed by an electronic device may retrieve configuration files for connected electronic devices. For example, the computer program may issue a command that may result in the configuration files being retrieved from the connected electronic devices or from one or more database.

In step 210, the computer program may parse the configuration files into sections and subsections. It may then store the parsed configuration files in a database.

In one embodiment, the computer program may parse each configuration file into one or more tree-like structures. Each of the trees may represent a section or subsection of the configuration file, along with its line number. This hierarchical structure helps in organizing the configuration data for further processing.

For example, the computer program may read the configuration file line by line, and, for each line, may create a section or subsection, including its line number. The sections and subsections may be organized into a tree structure based on their indentation levels, which indicate their depth in the hierarchy. For each section, the parents (i.e., the sections above) and the children (i.e., sections below) may be captured, thereby providing context for the configuration commands.

In step 215, using a user computer program, a user may submit a configuration-related query to a user interface for the computer program. Configuration-related user queries may vary depending on the specific needs and context of the network devices being managed. Examples of configuration-related user queries include (1) device-specific queries (e.g., queries for IP address configurations, queries for routing tables for a router, queries for firewall rules, etc.); (2) policy and security queries (queries for devices with a certain policy map, outdated security configurations, access control lists, etc.); (3) interface and connectivity queries (e.g., queries for active interfaces on a device, queries for interface configurations, etc.); (4) performance and monitoring queries (e.g., queries for current CPU utilization for a device, queries for bandwidth usage for an interface, queries for devices with high memory usage, etc.); (5) metadata and inventory queries (e.g., queries for the model and firmware version of a device, etc.); (6) troubleshooting and diagnostics queries (e.g., queries for recent configuration changes on a device, queries for error logs, etc.); etc. These and other queries may be processed by the system to retrieve relevant information from the configuration files, metadata, and other sources, providing users with the necessary data to manage and troubleshoot their network devices effectively.

In one embodiment, the query may specify a date or date range for the configuration file. For example, the date or date range may be used to filter devices that belong to the specific date or date range.

In addition, the date or date range may be used to compare a single connected electronic device over a range of dates by specifying the device name and date range in the query. The extraction of the date or date range from the query may be performed in the same as other metadata is extracted, such as by using prompt engineering. For example, the date or date range may be treated as another keyword in the query.

In step 220, the computer program may extract metadata and keywords from the configuration-related query. For example, the computer program may extract device metadata (e.g., device IDs, device family, etc.), platform keywords (e.g., types of network devices), configuration keywords (e.g., "interface", "IP address"), and configuration file section keywords (e.g., "policy-map 12345", "shutdown").

The device metadata allows for filtering devices based on various metadata fields, enabling different types of analysis. The keywords from the configuration files may be used to obtain the branches of the trees (from the devices filtered using metadata fields, for example, or directly from the devices) to respond to the user's query.

In one embodiment, the computer program may determine whether the keywords that are extracted are device metadata or belong to configuration files. This may be achieved through prompt engineering. For example, the role of the LLM may be set to an expert in configuration files for a particular brand of routers or switches so it can recognize keywords related to configuration files.

Device metadata may have limited values in each field, which may be retrieved in a file and placed in the LLM's context so it can recognize them as well. With this type of prompt engineering, the keywords may be extracted and classified.

The computer program may use a predefined list of domain-specific entities (e.g., device IDs, device families, policy maps) to identify relevant metadata keyword, keyword matching (e.g., matching a predefined list of configuration-related keywords such as "interface", "IP address", "routing table", etc. to match and extract relevant terms from the configuration-related query) and contextual analysis (e.g., analysis of the context of the configuration-related query to identify additional relevant keywords), etc.

The extracted metadata and configuration keywords may be combined to form a comprehensive set of keywords. Redundant or irrelevant keywords may be filtered out to ensure that only the most relevant terms are retained.

In step 225, the computer program may identify and retrieve the configuration file for electronic device by using the metadata. For example, if the configuration-related query includes "router JKL", the program recognizes "JKL" as the device ID. It may then query the database that stores the parsed configuration files for the connected electronic devices within the network.

In step 230, the computer program may obtain the branches for each keyword independently. For example, the branch for a policy-map, the branch for an interface, then the branch for another interface, and so on, depending on the keywords in the user query. These branches may then be placed in the context of the LLM to respond to the user query.

For example, for each line of the configuration file, the associated branch (including its ancestors and descendants) may be stored. To respond to the user query, the branches that are associated with each keyword may be searched.

In one embodiment, prompt engineering may be used to detect terms or keywords. For example, a user query might be: "Verify that on device 76384, the command 'shutdown' is in the policy map Lib_871." Through prompt engineering, the computer program may identify "76384" as the device, and "shutdown" and "policy-map Lib_871" as keywords or terms to search for in the configuration file.

Each of keyword (e.g., shutdown" and "policy-map Lib_871" in the example above) will have associated branches. In this particular case, the two branches are identical. Therefore, before placing them in the context of the LLM, duplicate branches are removed. The LLM will then respond to the user query based on this single branch. The response will confirm that the 'shutdown' command is indeed in the policy map Lib_871.

In step 235, the computer program may generate a prompt for LLM and may provide a prompt to LLM. For example, the identified branches of the configuration file may be used to generate a context for the LLM, and may be provided to the LLM with the configuration-related query.

In step 240, the LLM may use the context to generate a response to the configuration-related query and the context.

In step 245, the computer program may return the response to the user. For example, the computer program may receive the response from the LLM and may return it to the user through the user interface. The response may include the relevant configuration details requested in the query.

Figure 3:
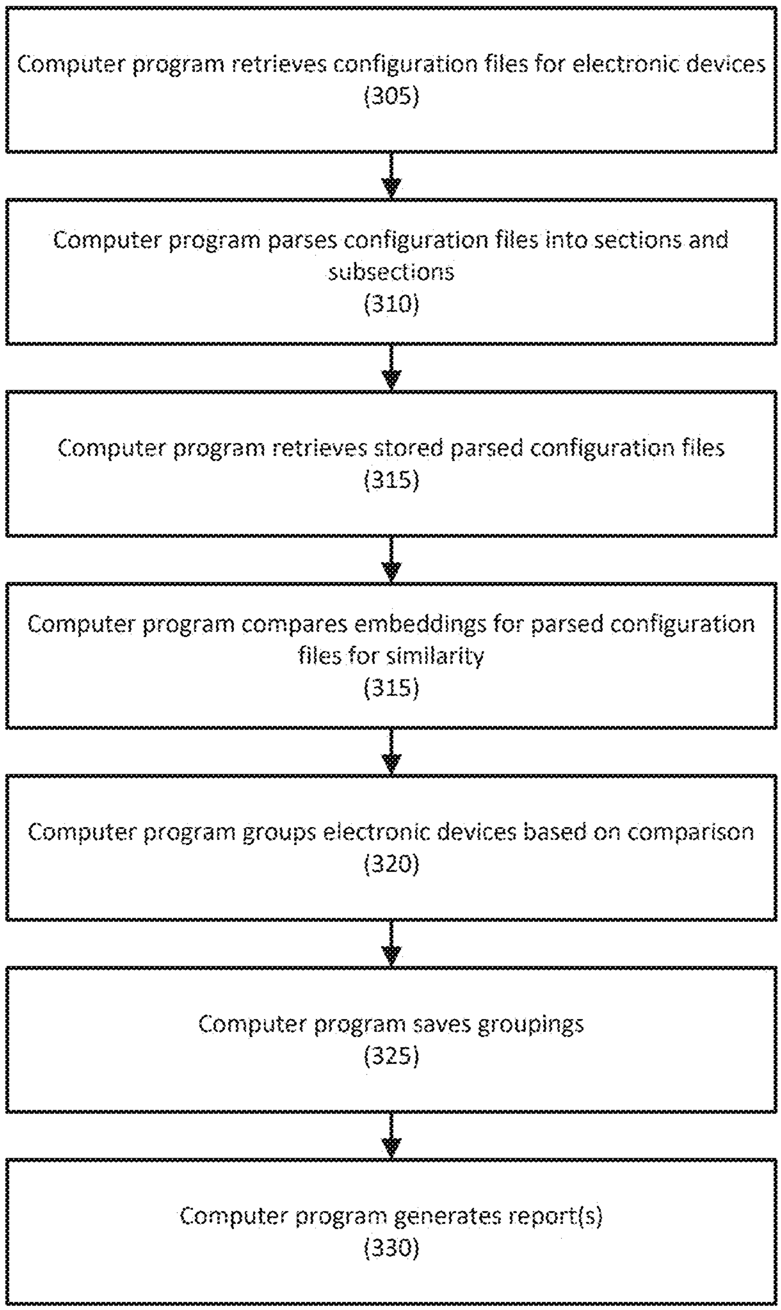
FIG. 3 depicts a method for clustering configuration files for connected devices according to an embodiment.

Referring to FIG. 3, a method for clustering configuration files for connected devices is provided according to an embodiment.

In step 305, periodically or as otherwise necessary and/or desired, a computer program executed by an electronic device may retrieve configuration files for connected electronic devices. For example, the computer program may issue a command that may result in the configuration files being retrieved from the connected electronic devices or from one or more database.

In step 310, the computer program may parse the configuration files into sections and subsections. It may then store the parsed configuration files in a database.

In one embodiment, the computer program may parse each configuration file into one or more tree-like structures. Each of the trees may represent a section or subsection of the configuration file, along with its line number. This hierarchical structure helps in organizing the configuration data for further processing.

For example, the computer program may read the configuration file line by line, and, for each line, may create a section or subsection, including its line number. The sections and subsections may be organized into a tree structure based on their indentation levels, which indicate their depth in the hierarchy. For each section, the parents (i.e., the sections above) and the children (i.e., sections below) may be captured, thereby providing context for the configuration commands.

The computer program may also identify commands (i.e., lines in the configuration file that do not have children) within the sections and subsections of the configuration file.

In step 315, periodically, or as otherwise desired, the computer program may retrieve the stored, parsed configuration files from a database. The computer program may generate vectors, or embeddings, of the retrieved sections and subsections using a pre-trained model. These embeddings capture the semantic meaning of the sections and subsections, allowing for a more accurate comparison.

In one embodiment, at least one of the stored, parsed configuration files may be a past configuration file. For example, the computer program may retrieve one or more past stored, parsed configuration files for the same device, for different devices, etc. This allows for configuration files from the same device to be compared to identify changes, or for configuration files (including past configuration files) from different devices to be compared.

In step 315, the computer program may compare the parsed configuration files. In one embodiment, the computer program may compare the embeddings for the sections and subsections of the configuration files. For example, the computer program may use cosine similarity to compare the embeddings of the sections and subsections. The cosine similarity between the embeddings determines how similar the sections and subsections are by measuring the cosine of the angle between two vectors, with a value of 1 indicating identical vectors and a value of 0 indicating orthogonal (completely different) vectors.

When commands are part of a subsection, the computer program may identify the most similar branch (subsection) in the reference data that starts with the same root (first line). It may then traverse the branch to calculate the similarity score for each command within the subsection. This ensures that the context of the commands within the subsection is taken into account during the matching process.

For commands that are a single line, computer program tool processes these commands by comparing them with similar single-line commands in the reference data. It may use a parameter, such as the "line range" parameter, to search for matching commands within a specific range of lines.

In step 320, the computer program may group the electronic devices based on the comparison of their configuration files. For example, the computer program may use clustering algorithms to group devices based on the similarity of their configuration files. Common clustering algorithms include cosine similarity, K-means, hierarchical clustering, and Density-Based Spatial Clustering of Applications with Noise (DBSCAN). The choice of algorithm depends on the specific requirements and characteristics of the data.

In one embodiment, a similarity threshold may be used to group the electronic devices. For example, devices having configuration files with a cosine similarity score of 1 will have identical configuration files. Devices with configuration files having a cosine similarity score above a certain threshold, such as 0.68, may be considered to have the same configuration, while those with cosine similarity scores below the threshold may be considered to have different configurations. This threshold is exemplary only, and different thresholds may be used as is necessary and/or desired.

Next, in step 325, the grouping may be stored in a database for future reference. The computer program may also provide a user interface to display the groups, allowing users to view and manage the grouped devices easily.

The computer program periodically updates the groupings as configuration files change. This ensures that the groups remain accurate and up-to-date.

In step 330, the computer program may generate reports. For example, the computer program may generate a Hypertext Markup Language (HTML) report, which may provide a visual representation of the matched configurations, and/or a spreadsheet-based report that may include additional features such as hyperlinks to the configuration files and filters.

Figure 4:
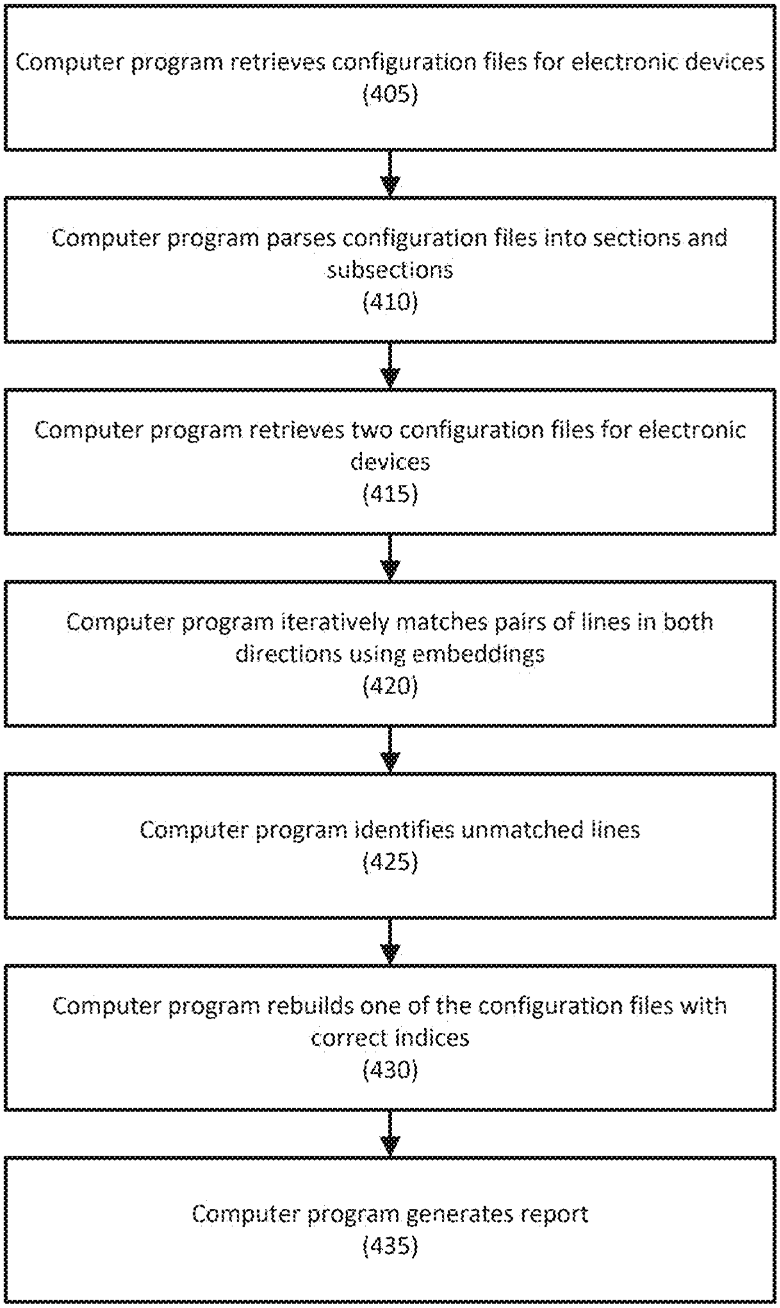
FIG. 4 depicts a method for updating configuration files for connected devices according to an embodiment.

Referring to FIG. 4, a method for updating configuration files for connected devices is provided according to an embodiment.

In step 405, periodically or as otherwise necessary and/or desired, a computer program executed by an electronic device may retrieve configuration files for connected electronic devices. For example, the computer program may issue a command that may result in the configuration files being retrieved from the connected electronic devices or from one or more database.

In step 410, the computer program may parse the configuration files into sections and subsections. It may then store the parsed configuration files in a database.

In one embodiment, the computer program may parse each configuration file into one or more tree-like structures. Each of the trees may represent a section or subsection of the configuration file, along with its line number. This hierarchical structure helps in organizing the configuration data for further processing.

For example, the computer program may read the configuration file line by line, and, for each line, may create a section or subsection, including its line number. The sections and subsections may be organized into a tree structure based on their indentation levels, which indicate their depth in the hierarchy. For each section, the parents (i.e., the sections above) and the children (i.e., sections below) may be captured, thereby providing context for the configuration commands.

The computer program may also identify commands (i.e., lines in the configuration file that do not have children) within the sections and subsections of the configuration file.

In step 415, periodically, or as otherwise desired, the computer program may retrieve two stored, parsed configuration files from a database.

In one embodiment, at least one of the stored, parsed configuration files may be a past configuration file. For example, the computer program may retrieve one or more past stored, parsed configuration files for the same device, for different devices, etc. This allows for configuration files from the same device to be compared to identify changes, or for configuration files (including past configuration files) from different devices to be compared.

In step 420, the computer program may iteratively match pairs of lines in both directions using embeddings.

An example process is as follows.

First, the computer program may attempt to match a configuration line from a first configuration file to a configuration line in a second configuration file. The first task is to determine the root line (e.g., the least indented line) in the first configuration file to which the configuration line belongs.

Next, the computer program may obtain the branch of the configuration line to be compared, along with its associated embedding in the first configuration file. For example, each configuration line has an associated branch, which allows for traversing that branch upwards (through its ancestors) until the least-indented line is reached. This is the root line.

Then, from all the branches of the second configuration file, the computer program may identify the most similar one by comparing the embedding of the branch from the first configuration file with the embeddings of the branches in the second configuration file. This may be done using the cosine similarity metric.

Once the most similar branch in the second configuration file is identified, the computer program may determine which configuration line in the second configuration file is most similar to the configuration line in the first configuration file. This may use the embeddings of the configuration lines, without considering ancestors and descendants, as the goal is to find the most similar configuration line within the most similar branch identified in the previous step.

Once the most similar configuration line is found, the computer program may repeat the process in the opposite direction, i.e., from the second configuration file to the first configuration file. If both directions yield the same configuration lines and the similarities exceed a certain threshold, which is a parameter of the algorithm, then there is a match for the configuration line.

For commands that are a single line, computer program tool processes these commands by comparing them with similar single-line commands in the reference data. It may use a parameter, such as the "line range" parameter, to search for matching commands within a specific range of lines. The line parameter may be configurable by the user.

In one embodiment, the cosine similarity of the embeddings may be used to consider the embeddings for lines that were initially missed.

An example of matching is as follows. Suppose we want to match the configuration line 'IP 123.223.123.345' found at line 176 in File A with another configuration line in File B. Since configuration files are often quite similar, it is likely that the match for this line will be near line 176 in File B, so a line parameter, such as 15, may be used to search within 15 lines of line 176 of File B.

First, the computer program may create a window based on the initial position of the configuration line and the 'line window' parameter. In this case, it would be [176−15, 176+15], resulting in [161, 191].

Next, the computer program may search for the most similar configuration line within this window in File B that is not part of any branch. This is done using line embeddings and cosine similarity.

Next, the process may be repeated in the opposite direction, searching for the most similar configuration line to the one found in the previous step.

If the configuration lines found in both directions are the same and the similarity (in steps 2 and 3) is greater than a threshold parameter of the algorithm, then we conclude that there is a match.

The processed data may then be enhanced with additional information, such as device roles and models, to provide a more comprehensive output.

In step 425, the computer program may identify unmatched lines. For example, after finding the matches, the lines that were not matched are identified.

In step 430, the computer program may rebuild one of the configuration files with the correct indices (e.g., line numbers and sections). This ensures that the final output accurately represents the original configuration files.

In step 435, the computer program may generate one or more audit reports. For example, the computer program may generate a HTML report that may provide a visual representation of the matched configurations, and/or a spreadsheet report that may include additional features such as hyperlinks to the configuration files and filters. The reports may use color coding to indicate the status of the configurations, such as green for identical lines, yellow for similar lines, and red for missing lines.

The reports may include columns, such as: index_line_file_a, configuration_file_a, index_line_file_b, configuration_file_b, and similarity_score. One column will contain the configuration from one file, and another column will contain the configuration from the other file, followed by two columns indicating the index of the configuration lines, and finally, the similarity_score.

The computer program may add any missing columns to the data to ensure completeness. It may also combine the processed data from different files into a single structured format, may sort parts of the combined data in order to generate the Excel and HTML reports, and the indices are reset to ensure the correct order and structure.

Figure 5:
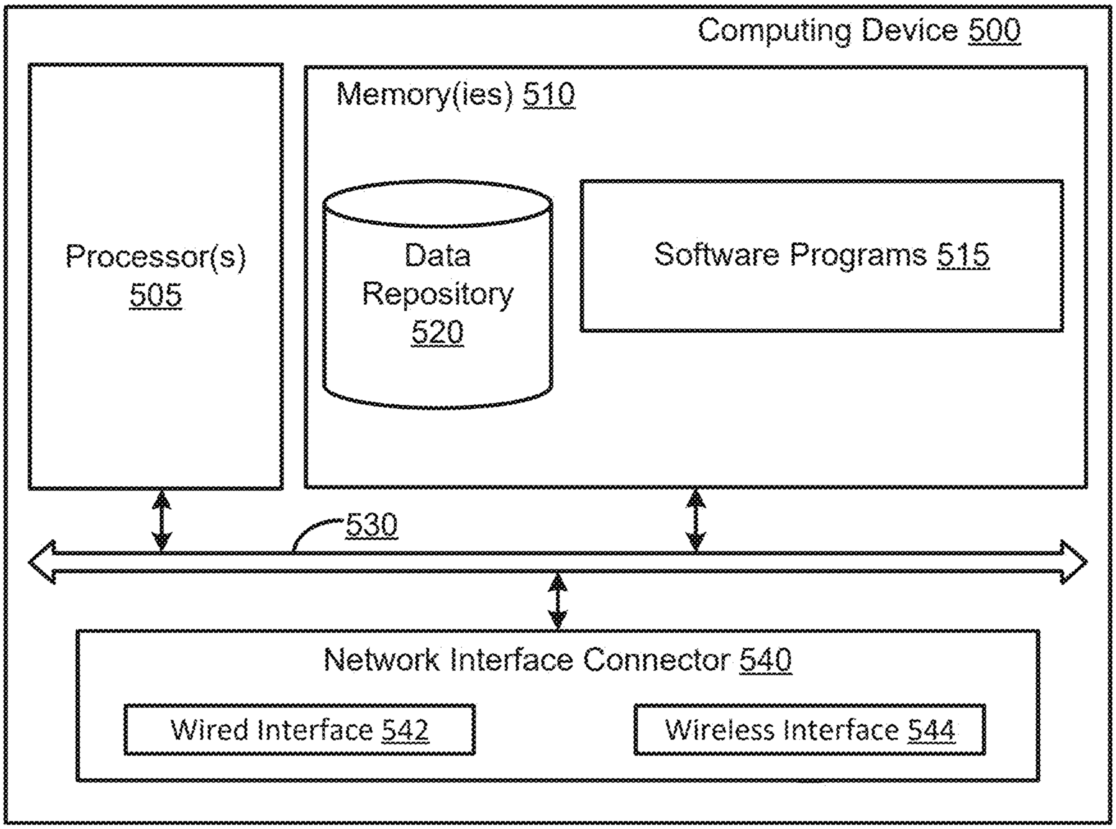
FIG. 5 depicts an exemplary computing system for implementing aspects of the present disclosure.

FIG. 5 depicts an exemplary computing system for implementing aspects of the present disclosure. FIG. 5 depicts exemplary computing device 500. Computing device 500 may represent the system components described herein. Computing device 500 may include processor 505 that may be coupled to memory 510. Memory 510 may include volatile memory. Processor 505 may execute computer-executable program code stored in memory 510, such as software programs 515. Software programs 515 may include one or more of the logical steps disclosed herein as a programmatic instruction, which may be executed by processor 505. Memory 510 may also include data repository 520, which may be nonvolatile memory for data persistence. Processor 505 and memory 510 may be coupled by bus 530. Bus 530 may also be coupled to one or more network interface connectors 540, such as wired network interface 542 or wireless network interface 544. Computing device 500 may also have user interface components, such as a screen for displaying graphical user interfaces and receiving input from the user, a mouse, a keyboard and/or other input/output components (not shown).

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method, comprising:

retrieving, by a computer program executed by an electronic device, a plurality of configuration files, each configuration file associated with a connected electronic device in a computer network comprising a plurality of connected electronic devices;

parsing, by the computer program, each of the plurality of configuration files into a plurality of sections and subsections;

storing, by the computer program, the parsed plurality of configuration files to a database;

receiving, from a user interface for the computer program, a configuration-related query;

extracting, by the computer program, metadata and keywords from the configuration-related query;

identifying, by the computer program, one of the stored parsed configuration files using the metadata;

retrieving, by the computer program, the identified one of the stored parsed configuration files;

identifying, by the computer program, relevant branches in the retrieved configuration file that include the keywords;

generating, by the computer program, a prompt for a large language model including the configuration-related query and the identified relevant branches as context for the configuration-related query;

receiving, by the computer program, a response to the prompt from the large language model; and returning, by the computer program, the response to the user interface.

2. The method of claim 1, wherein the plurality of configuration files are parsed into tree-like structures.

3. The method of claim 1, wherein each section and subsection comprises a line number of the configuration file, an identification of one or more parent sections and/or subsections, and an identification of one or more child subsections.

4. The method of claim 1, wherein the keywords comprise device metadata keywords, platform metadata keywords, configuration metadata keywords, and configuration file section keywords.

5. The method of claim 1, wherein identified relevant sections and subsections of retrieved configuration file comprise all of the extracted keywords.

6. The method of claim 1, further comprising:

removing, by the computer program, duplicate branches.

7. A method, comprising:

retrieving, by a computer program executed by an electronic device, a plurality of configuration files, each configuration file associated with a connected electronic device in a computer network comprising a plurality of connected electronic devices;

parsing, by the computer program, each of the plurality of configuration files into a plurality of sections and subsections;

storing, by the computer program, the parsed plurality of configuration files to a database;

retrieving, by the computer program, a plurality of the stored parsed plurality of configuration file from the database;

generating, by the computer program, embeddings for the plurality of sections and subsections of the retrieved stored parsed configuration files;

comparing, by the computer program, the embeddings of the plurality of sections and subsections of the stored parsed plurality of configuration files; and grouping, by the computer program, the plurality of connected electronic devices based on a similarity of the embeddings of their sections and subsections.

8. The method of claim 7, wherein the plurality of configuration files are parsed into tree-like structures.

9. The method of claim 7, wherein the embeddings of the sections and subsections of the stored parsed plurality of configuration files are compared using cosine similarity values for the embeddings of the sections and subsections of the stored parsed plurality of configuration files.

10. The method of claim 9, wherein the plurality of connected electronic devices are grouped according to one or more similarity thresholds.

11. The method of claim 7, further comprising:

generating, by the computer program, a report comprising a visual representation of the plurality of configuration files for the plurality of connected electronic devices.

12. The method of claim 11, wherein the report further comprises hyperlinks to the plurality of configuration files for the plurality of connected electronic devices.

13. A method, comprising:

retrieving, by a computer program executed by an electronic device, a plurality of configuration files, each configuration file associated with a connected electronic device in a computer network comprising a plurality of connected electronic devices;

parsing, by the computer program, each of the plurality of configuration files into a plurality of sections and subsections;

storing, by the computer program, the parsed plurality of configuration files to a database;

retrieving, by the computer program, a first stored parsed configuration file for a first configuration file and a second stored parsed configuration file for a second configuration file from the database;

generating, by the computer program, embeddings for the plurality of sections and subsections of the first stored parsed configuration file and the second stored parsed configuration file;

matching, by the computer program, embeddings for the plurality of sections and subsections of the first stored parsed configuration file to the embeddings for the sections and subsections of the second stored parsed configuration file; and rebuilding, by the computer program, one of the plurality of sections or subsections of the first stored parsed configuration file or the second stored parsed configuration file in response to the section or subsection not matching.

14. The method of claim 13, wherein the plurality of configuration files are parsed into tree-like structures.

15. The method of claim 14, wherein the plurality of sections and subsections are organized based on a depth for each section and subsection in a hierarchy of each of the plurality of configuration files.

16. The method of claim 13, wherein the computer program matches the embeddings of the plurality of sections and subsections of the first stored parsed configuration file to the embeddings for the plurality of sections and subsections of the second stored parsed configuration file by matching lines in the first stored parsed configuration file to lines in the second stored parsed configuration file.

17. The method of claim 16, wherein the computer program uses a line parameter to set a window for searching the second stored parsed configuration file for a configuration line in the first stored parsed configuration file.

18. The method of claim 17, wherein the searching is performed in a first direction, and then in a second direction.

19. The method of claim 13, further comprising:

generating, by the computer program, an audit report comprising a visual representation of the first stored parsed configuration file and the second stored parsed configuration file, and similarity scores for configuration lines in the first stored parsed configuration file and the second stored parsed configuration file.

20. The method of claim 19, wherein the audit report comprises hyperlinks to the first stored parsed configuration file and the second stored parsed configuration file.

* * * * *